(12) United States Patent
Hed

(10) Patent No.: US 7,676,938 B1
(45) Date of Patent: Mar. 16, 2010

(54) BICYCLE WHEEL AND HUB APPARATUS AND METHOD

(75) Inventor: Steven Arthur Hed, North Oaks, MN (US)

(73) Assignee: Hed Cycling Products, Inc., Shoreview, MN (US)

( * ) Notice: Subject to any disclaimer, the term of this patent is extended or adjusted under 35 U.S.C. 154(b) by 382 days.

(21) Appl. No.: 11/767,749

(22) Filed: Jun. 25, 2007

Related U.S. Application Data

(60) Provisional application No. 60/816,511, filed on Jun. 26, 2006.

(51) Int. Cl.
*G01B 5/255* (2006.01)
*G01B 5/24* (2006.01)

(52) U.S. Cl. .................. 33/203.18; 33/203.19

(58) Field of Classification Search .................. 33/203, 33/203.18, 203.19, 203.2, 203.12
See application file for complete search history.

(56) References Cited

U.S. PATENT DOCUMENTS

| | | | |
|---|---|---|---|
| 1,240,528 A * | 9/1917 | Alsworth | 33/203.19 |
| 2,325,362 A * | 7/1943 | Black Sr. | 33/203.19 |
| 3,789,475 A * | 2/1974 | Barwell | 29/894.33 |
| 3,964,303 A * | 6/1976 | Vexelman et al. | 33/203.19 |
| 5,193,283 A * | 3/1993 | Hsiao | 33/203.19 |
| 5,201,782 A | 4/1993 | Bartlett | |
| 5,243,765 A | 9/1993 | Lynch | |
| 5,459,930 A | 10/1995 | Crisick | |
| 5,546,665 A * | 8/1996 | Jackmauh | 33/203 |
| 5,931,544 A * | 8/1999 | Dietrich | 301/58 |
| 6,428,113 B2* | 8/2002 | Dietrich | 301/59 |
| 2003/0057763 A1* | 3/2003 | Dietrich | 301/59 |
| 2007/0085413 A1* | 4/2007 | Lin | 301/55 |
| 2009/0020231 A1* | 1/2009 | Rugel | 33/203.18 |

* cited by examiner

*Primary Examiner*—Yaritza Guadalupe-McCall
(74) *Attorney, Agent, or Firm*—Dorsey & Whitney LLP

(57) ABSTRACT

A bicycle wheel and hub apparatus capable of dynamically and precisely truing a bicycle wheel, and a method thereof, is provided. The bicycle wheel and hub apparatus includes a hub, including a hub body and a hub mounting plate, adaptable to a center hole of the bicycle wheel, a mounting device for mounting the hub onto the bicycle wheel, and a plurality of set screws for truing the bicycle wheel relative to the hub.

15 Claims, 6 Drawing Sheets

BICYCLE WHEEL AND HUB APPARATUS AND METHOD

CROSS-REFERENCE TO RELATED APPLICATION

This patent application claims the priority of U.S. Provisional Patent Application Ser. No. 60/816,511, filed on Jun. 26, 2006, and subject matter of which is incorporated herewith by reference.

FIELD OF THE INVENTION

The present invention relates generally to a bicycle wheel and hub apparatus and method. More particularly, the present invention relates to a bicycle wheel and hub apparatus and method which provides a mechanism capable of dynamically and precisely truing a bicycle wheel.

BACKGROUND OF THE INVENTION

Bicycle wheel and hub systems and methods of truing bicycle wheel and hub systems are well known to those skilled in the art. A bicycle wheel and hub system with improved mechanisms that are capable of dynamically and precisely truing a bicycle wheel are desired. Bicycle wheels are typically trued such that running or spinning wheels do not wobble.

Accordingly, it is desirable to those skilled in the art for an improved, dynamic and precise truing system and method.

SUMMARY OF THE INVENTION

The present invention provides a bicycle wheel and hub apparatus and method which provides a mechanism capable of dynamically and precisely truing a bicycle wheel.

In one embodiment of the present invention, a bicycle wheel and hub apparatus comprises: a hub, having a hub body and a hub mounting plate, adaptable to a center hole of a wheel, such as a disc wheel; a mounting device, such as a clamp device, a set of screws, and/or glue, etc., to fasten the hub onto the wheel; and a plurality of set screws for truing the wheel relative to the hub.

Further in one embodiment, the set screws are separately disposed on the hub mounting plate in adjacent to the center hole of the hub body. The force applied onto a planetary surface of the wheel by one or more set screws is adjustable by moving the set screws towards or away from the surface of the wheel, thereby adjusting planetary and/or tilting angles of the wheel relative to the hub. The radial distance from the set screws to the hub and the transverse distance between the set screws and the surface of the wheel are configured and arranged such that the effect caused by such dynamic adjustment allows precise truing of the wheel.

The present invention also provides a method of truing a bicycle wheel and hub apparatus by placing the apparatus on a truing stand, adjusting at least one set screw, and spinning the wheel, measuring/monitoring truing specification of the wheel, and repeating the adjusting, spinning and measuring/monitoring steps until the wheel is trued according to the truing specification.

These and other advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

Figure 1:
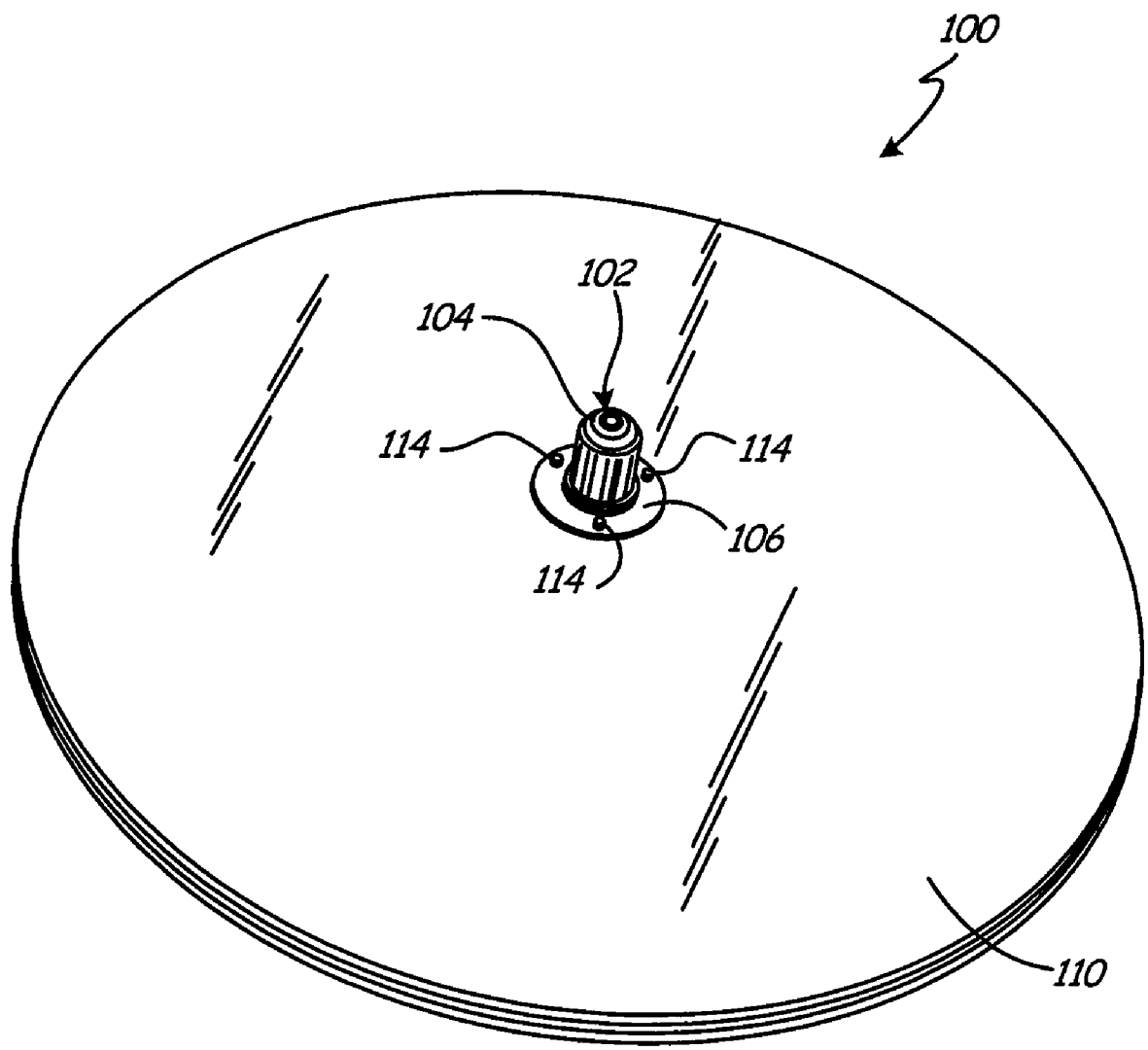
FIG. 1 illustrates a perspective view of one embodiment of a bicycle wheel and hub apparatus generally in accordance with the principles of the present invention.
Figure 2:
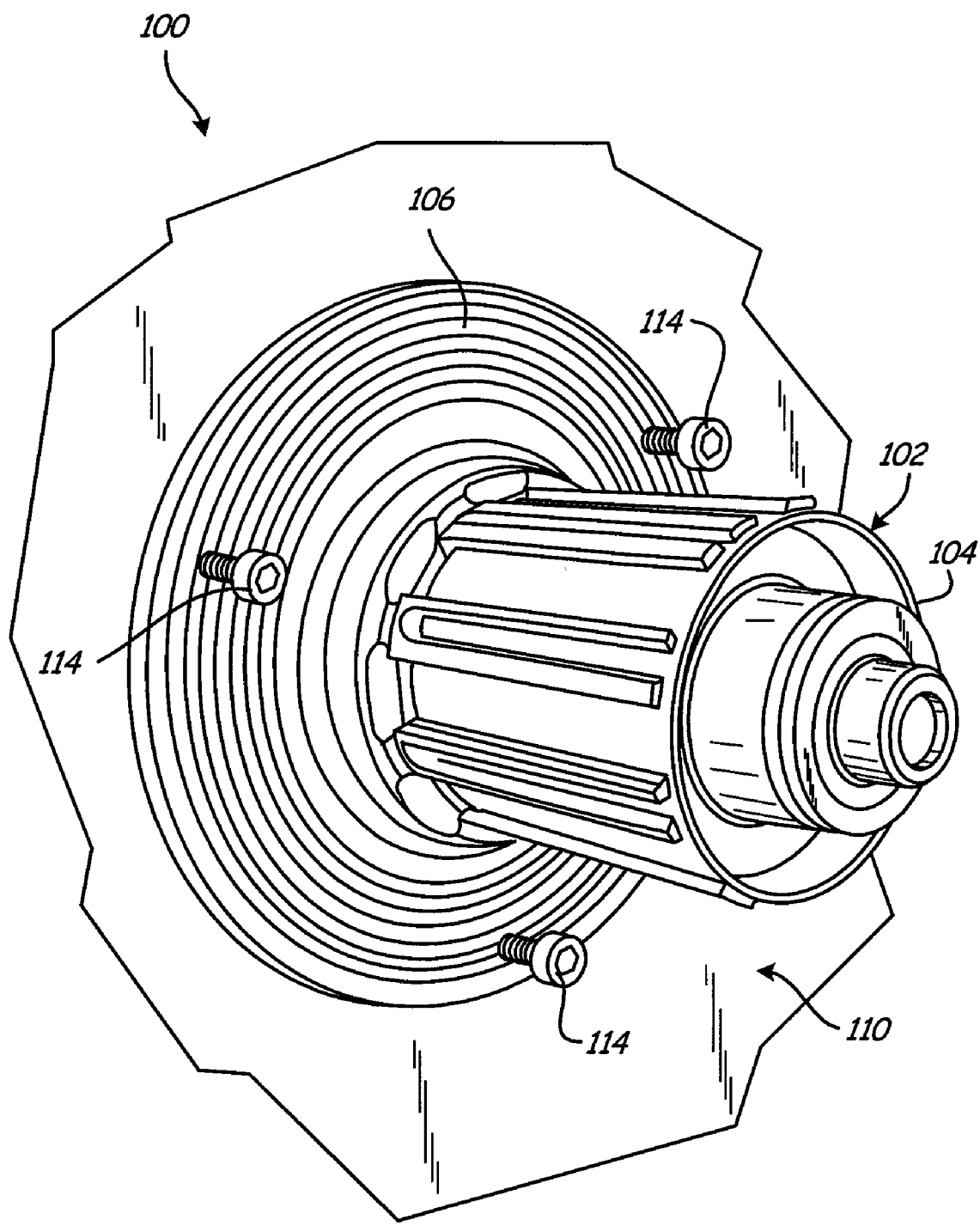
FIG. 2 illustrates a perspective, enlarged front partial view of one embodiment of the bicycle wheel and hub apparatus generally in accordance with the principles of the present invention.
Figure 3:
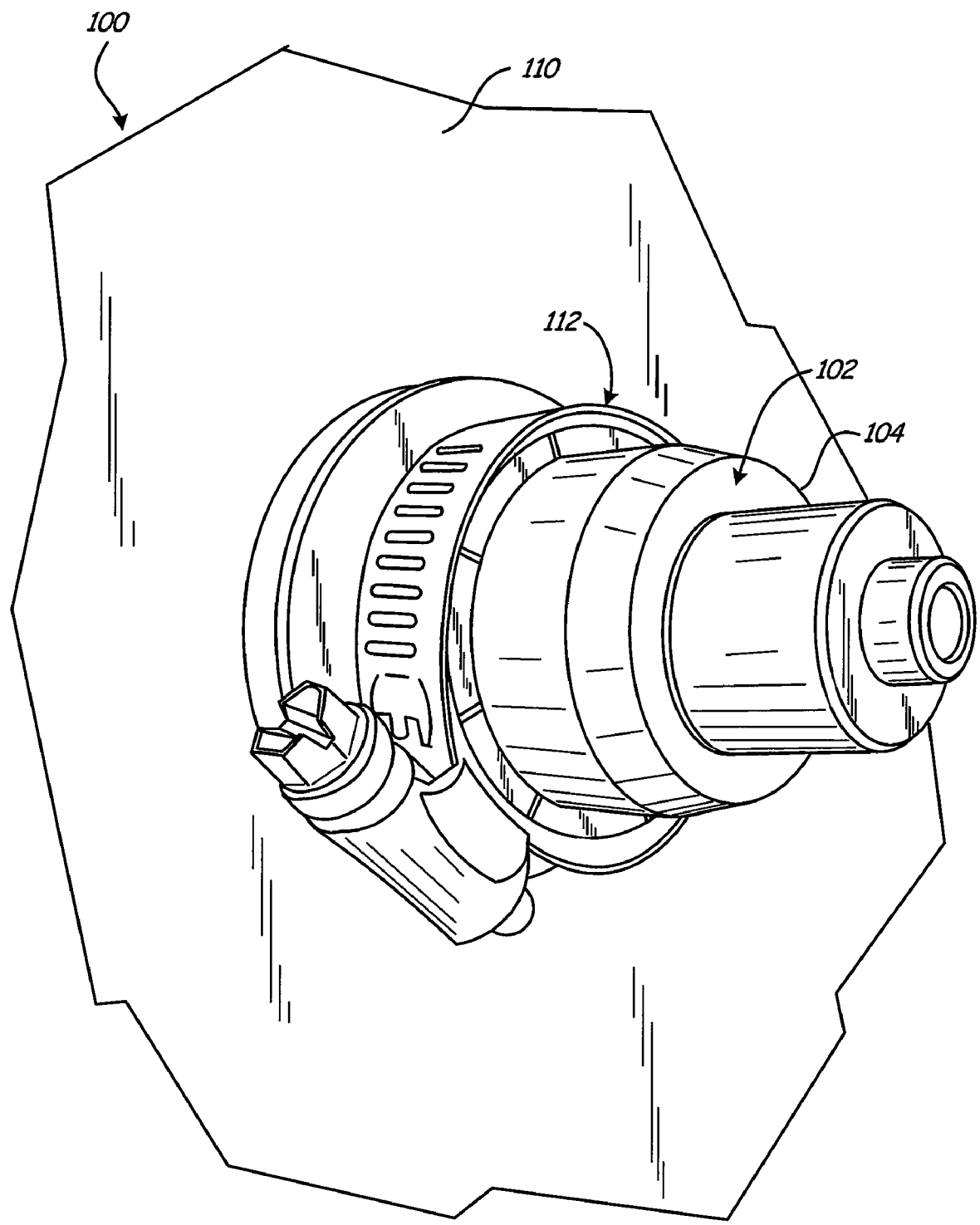
FIG. 3 illustrates a perspective, enlarged rear partial view of one embodiment of the bicycle wheel and hub apparatus generally in accordance with the principles of the present invention.
Figure 4:
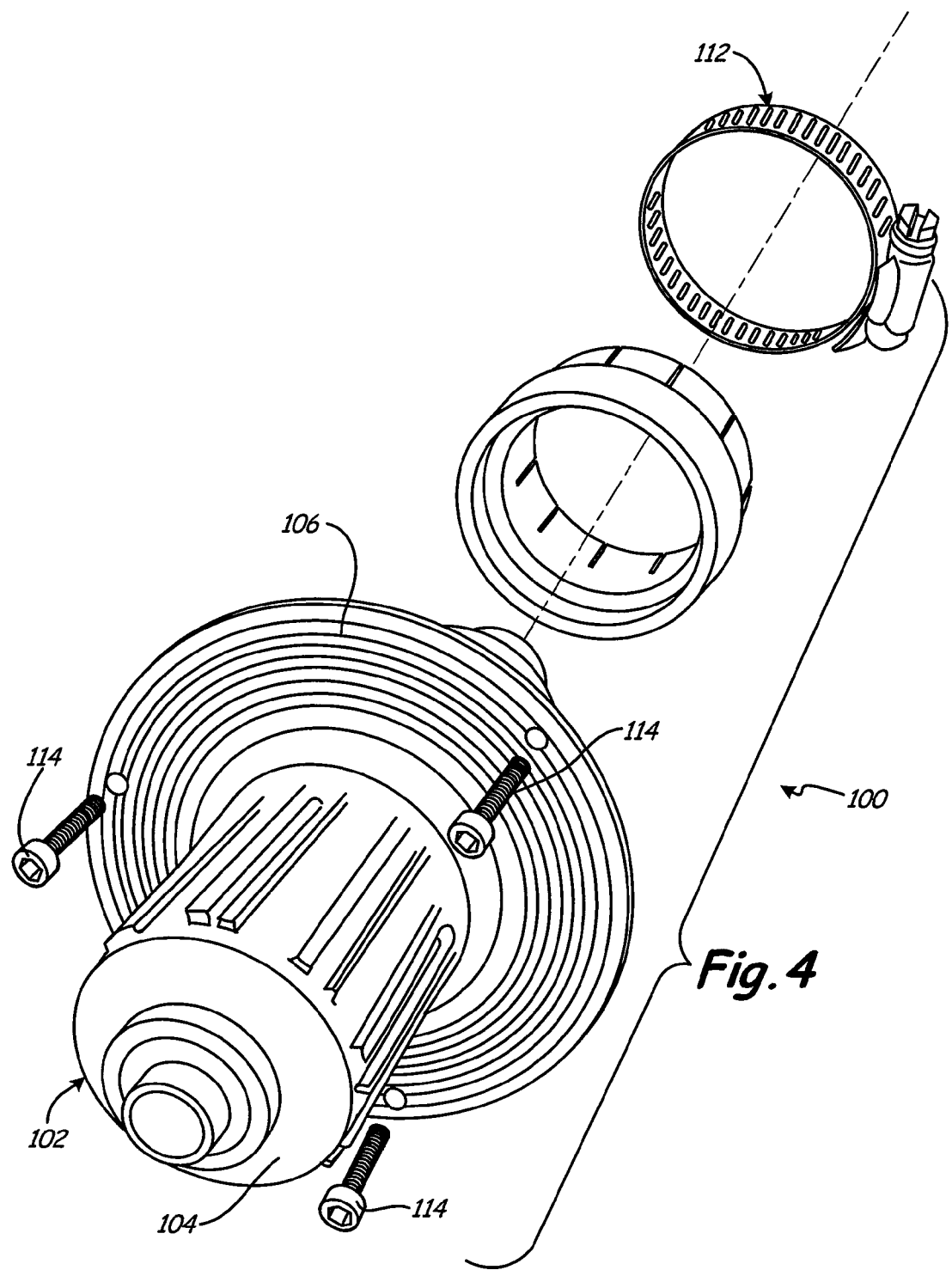
FIG. 4 illustrates a perspective, exploded front partial view of one embodiment of the bicycle wheel and hub apparatus generally in accordance with the principles of the present invention.

In FIGS. 1-6, a bicycle wheel and hub apparatus 100 generally in accordance with the principles of the present invention includes: a hub 102, having a hub body 104 and a hub mounting plate 106, adaptable to a center hole 108 of a wheel 110, such as a disc wheel; a mounting device 112, such as a clamp device, a set of screws, and/or glue, etc., to fasten the hub 102 onto the wheel 110; and a plurality of set screws 114 for truing the wheel 110 relative to the hub 102.

Figure 5:
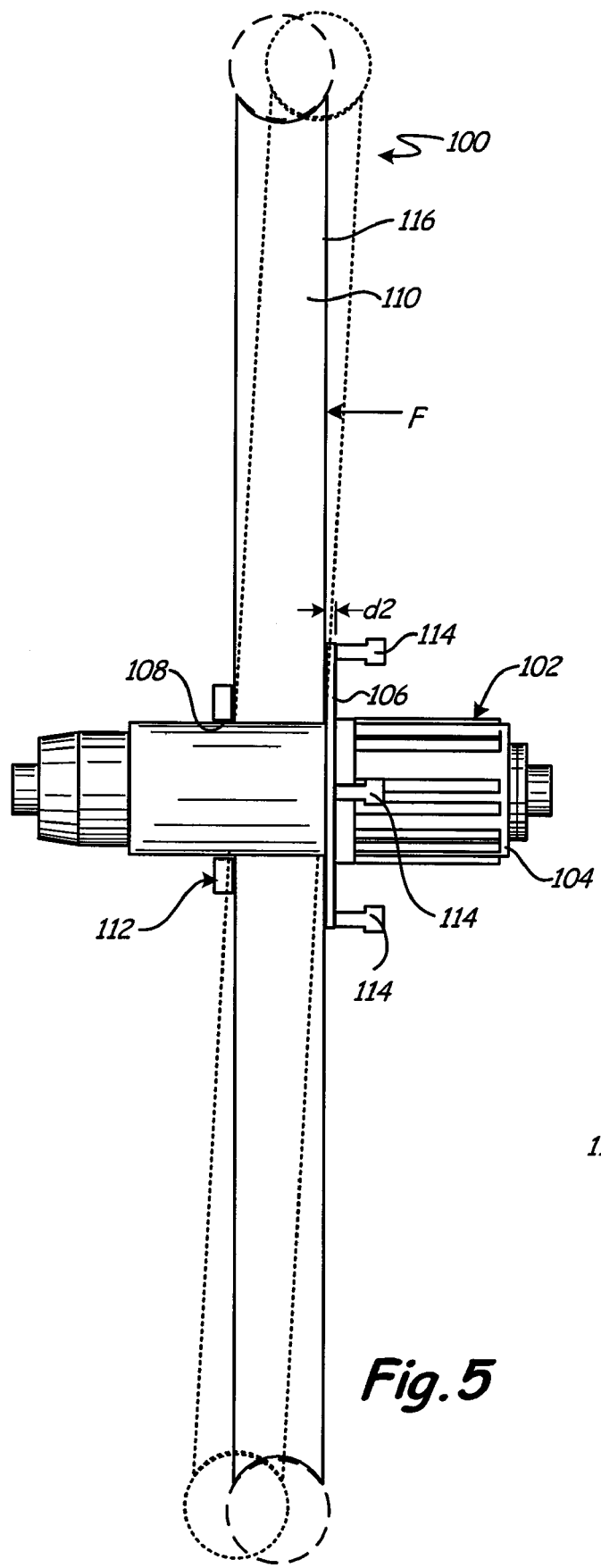
FIG. 5 illustrates a side elevation view of one embodiment of the bicycle wheel and hub apparatus generally in accordance with the principles of the present invention.
Figure 6:
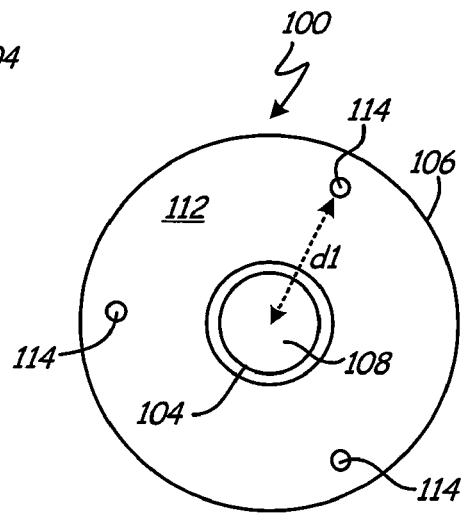
FIG. 6 illustrates a front elevation view of one embodiment of the bicycle wheel and hub apparatus shown in FIG. 5 generally in accordance with the principles of the present invention.

As shown in FIGS. 1-6, the set screws 114 are separately disposed on the hub mounting plate 106 in adjacent to the center hole 108 of the hub body 104. In FIG. 5, the force F applied onto a planetary surface 116 of the wheel 110 by one or more set screws 114 is adjustable by moving the set screws 114 towards or away from the surface 116 of the wheel 110, thereby adjusting planetary and/or tilting angles of the wheel 110 relative to the hub 102. The radial distance, d1 (see FIG. 6), from the set screws 114 to the center of the hub 102 and the transverse distance, d2 (see FIG. 5), between the set screws 114 and the surface 116 of the wheel 110 are configured and arranged such that the effect caused by such dynamic adjustment allows precise truing of the wheel 110.

To true a bicycle wheel and hub apparatus 100 generally in accordance with the principles of the present invention, the bicycle wheel and hub apparatus 100 is placed on a conventional truing stand (not shown), then at least one set screw is adjusted by moving the at least one set screw 114 towards or away from the surface 116 of the wheel 110, spinning the wheel 110, and measuring/monitoring truing specification of the wheel 110, and repeating such adjusting, measuring/monitoring steps until the wheel 110 is trued according to the truing specification.

From the above description and drawings, it will be understood by those of skilled in the art that the particular embodiments shown and described are for purposes of illustration only and are not intended to limit the scope of the present invention. Those of skilled in the art will recognize that the present invention may be embodied in other specific forms without departing from its spirit or essential characteristics. References to details of particular embodiments are not intended to limit the scope of the invention. For example, in FIGS. 1-6, glue may be applied between the wheel 110 and the hub mounting plate 106 to further secure the hub 102 onto the wheel 110. The set screws 114 may be used to true the wheel 110 when the glue is in its wet condition.

Figure 7:
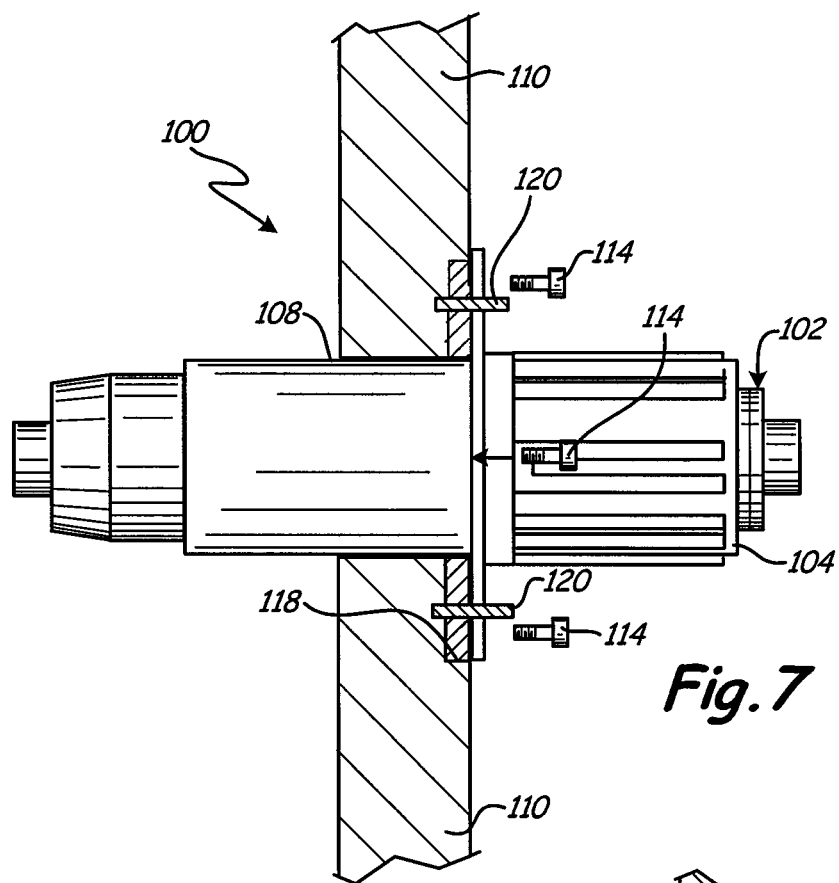
FIG. 7 illustrates a partial side elevation view of a second embodiment of the bicycle wheel and hub apparatus generally in accordance with the principles of the present invention.
Figure 8:
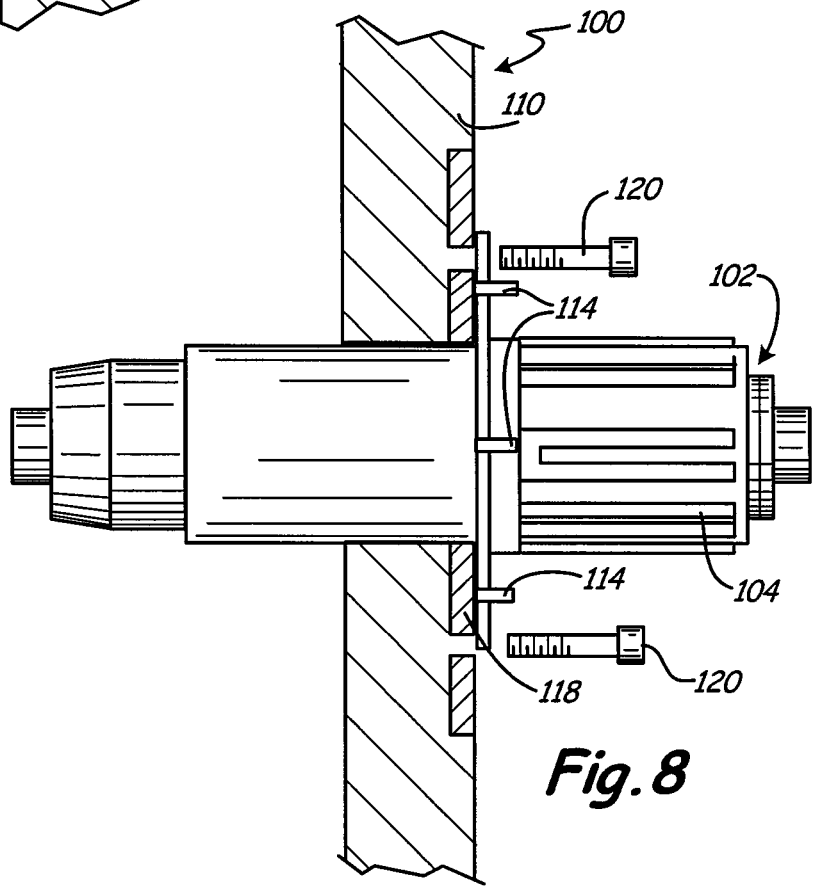
FIG. 8 illustrates a partial side elevation view of a third embodiment of the bicycle wheel and hub apparatus generally in accordance with the principles of the present invention.

Also, in one embodiment, the set screws 114 may be removed once the glue is dry. Further, as illustrated in FIGS. 7 and 8, the wheel 110 provides clearance space 118 for fasteners 120, instead of the clamp device 112, for mounting the hub 102 onto the wheel 110. Such configuration and arrangement may provide additional aerodynamic effect.

It is appreciated that the configuration and arrangement of the set screws 114 or the equivalent thereof can be varied to achieve the same or substantially the same results. For example, the set screws 114 are configured and arranged such that they can also be moved radially towards and from the center of the hub mounting plate 106, transversely in a planetary surface 122 around the center of the hub mounting plate 106, and/or a combination thereof. It is also appreciated that the adjustment can be monitored with a suitable electrical circuit controller and/or a programmable software controller.

Also, in the truing method, glue can be applied between the hub mounting plate 106 and the wheel 110 before the truing step. The set screws 114 may be removed after the glue is dry. Furthermore, a shim or chip (not shown) may be added between the wheel 110 and the hub mounting plate 106 if desired.

Moreover, the gist of the bicycle wheel and hub apparatus and truing method as described above can also be applied to different bicycle wheel and hub apparatuses, such as spoke wheels, etc., without departing from the spirit and scope of the present invention.

What is claimed is:

1. A bicycle wheel and hub apparatus capable of dynamically and precisely truing a bicycle wheel, comprising:
   a hub, including a hub body and a hub mounting plate, adaptable to a center hole of the bicycle wheel;
   a mounting device for mounting the hub onto the bicycle wheel; and
   a plurality of set screws, separately disposed on the hub mounting plate in adjacent to center of the hub body, for truing the bicycle wheel relative to the hub, wherein force applied onto a planetary surface of the bicycle wheel by the at least one set screw is adjustable by moving the set screws towards or away from the planetary surface of the bicycle wheel, thereby adjusting planetary and/or tilting angles of the bicycle wheel relative to the hub.

2. The apparatus of claim 1, wherein a radial distance from the at least one set screw to the center of the hub body and a transverse distance between the at least one set screw and the planetary surface of the bicycle wheel are configured and arranged such that effect caused by dynamic adjustment allows precise truing of the bicycle wheel.

3. The apparatus of claim 1, wherein the bicycle wheel is a disc wheel.

4. The apparatus of claim 1, wherein the bicycle wheel is a spoke wheel.

5. The apparatus of claim 1, wherein glue is disposed between the bicycle wheel and the hub mounting plate to further secure the hub onto the bicycle wheel.

6. The apparatus of claim 5, wherein the set screws true the bicycle wheel when the glue is in wet condition.

7. The apparatus of claim 6, wherein the set screws are removed once the glue is dry.

8. The apparatus of claim 1, wherein the mounting device is a clamp device.

9. The apparatus of claim 1, wherein the bicycle wheel includes clearance space, the mounting device includes at least one fastener disposed in the clearance space for mounting the hub onto the bicycle wheel.

10. A method of truing a bicycle wheel, comprising the steps of:
    providing a bicycle wheel and hub apparatus comprising a hub, including a hub body and a hub mounting plate, adaptable to a center hole of the bicycle wheel, a mounting device for mounting the hub onto the bicycle wheel, a plurality of set screws, separately disposed on the hub mounting plate in adjacent to center of the hub body, for truing the bicycle wheel relative to the hub, wherein force applied onto a planetary surface of the bicycle wheel by the at least one set screw is adjustable by moving the set screws towards or away from the planetary surface of the bicycle wheel, thereby adjusting planetary and/or tilting angles of the bicycle wheel relative to the hub;
    placing the apparatus on a truing stand;
    adjusting the at least one set screw;
    spinning the bicycle wheel;
    measuring/monitoring truing specification of the bicycle wheel; and
    repeating the adjusting, spinning and measuring/monitoring steps until the bicycle wheel is trued according to the truing specification.

11. The method of claim 10, wherein the bicycle wheel is a disc wheel.

12. The method of claim 10, wherein the bicycle wheel is a spoke wheel.

13. The method of claim 10, further comprising the step of applying glue between the bicycle wheel and the hub mounting plate to further secure the hub onto the bicycle wheel.

14. The method of claim 13, wherein the set screws true the bicycle wheel when the glue is in wet condition.

15. The method of claim 14, further comprising the step of removing the set screws once the glue is dry.

* * * * *